US011224953B2

(12) United States Patent
Chabirand et al.

(10) Patent No.: US 11,224,953 B2
(45) Date of Patent: Jan. 18, 2022

(54) METHOD FOR DETERMINING A DIMENSION BETWEEN THE BACK AND THE CUTTING EDGE OF A VIBRATING BLADE MOUNTED ON A CUTTING TOOL

(71) Applicant: LECTRA, Paris (FR)

(72) Inventors: Didier Chabirand, Cestas (FR); Régis Pierre André Lallement, Cestas (FR)

(73) Assignee: LECTRA, Paris (FR)

( * ) Notice: Subject to any disclaimer, the term of this patent is extended or adjusted under 35 U.S.C. 154(b) by 74 days.

(21) Appl. No.: 16/627,446

(22) PCT Filed: Jun. 19, 2018

(86) PCT No.: PCT/FR2018/051461
§ 371 (c)(1),
(2) Date: Dec. 30, 2019

(87) PCT Pub. No.: WO2019/002719
PCT Pub. Date: Jan. 3, 2019

(65) Prior Publication Data
US 2021/0069846 A1   Mar. 11, 2021

(30) Foreign Application Priority Data
Jun. 30, 2017   (FR) ...................................... 1756126

(51) Int. Cl.
*B23Q 17/09*   (2006.01)
*G06T 7/13*    (2017.01)
*B23Q 17/24*   (2006.01)

(52) U.S. Cl.
CPC ..... *B23Q 17/0919* (2013.01); *B23Q 17/2409* (2013.01); *B23Q 17/2457* (2013.01);
(Continued)

(58) Field of Classification Search
CPC ........... B23Q 17/0919; B23Q 17/2409; B23Q 17/2457; B26D 5/007; B26D 7/086;
(Continued)

(56) References Cited

U.S. PATENT DOCUMENTS 5,573,442 A * 11/1996 Morita .................... B24B 3/361
                                                              451/5
5,768,154 A *  6/1998 Zelt, III ............... G01B 11/046
                                                              382/152
(Continued)

FOREIGN PATENT DOCUMENTS

FR    2709177 A1    2/1995
JP    5344918 B2   11/2013

OTHER PUBLICATIONS

International Search Report and Written Opinion from PCT Application No. PCT/FR2018/051461, dated Aug. 7, 2018.
(Continued)

*Primary Examiner* — Dakshesh D Parikh
(74) *Attorney, Agent, or Firm* — Workman Nydegger

(57) ABSTRACT

A method for determining a dimension between the back and the cutting edge of a vibrating blade mounted on a cutting head includes successively of acquiring a digital image of the blade mounted on the cutting tool so a line corresponding to a cutting edge of the blade and a line corresponding to a back of the blade are visible in the image, determining on the digital image along a straight line perpendicular to the line corresponding to the cutting edge of the blade the pixels comprised between the line corresponding to the cutting edge of the blade and the line corresponding to the back of the blade, and calculating a filtered dimension between the back and the cutting edge of the blade from the number of
(Continued)

pixels comprised between the line corresponding to the cutting edge of the blade and the line corresponding to the back of the blade.

9 Claims, 2 Drawing Sheets

(52) U.S. Cl.
CPC ...... *G06T 7/13* (2017.01); *G06T 2207/20024* (2013.01); *G06T 2207/30164* (2013.01)

(58) Field of Classification Search
CPC .................... B26D 7/12; G01B 11/046; G06T 2207/20024; G06T 2207/30164; G06T 7/13

See application file for complete search history.

(56) References Cited

U.S. PATENT DOCUMENTS

| | | | |
|---|---|---|---|
| 10,198,826 B2* | 2/2019 | Inui | G06T 7/0004 |
| 2012/0229621 A1* | 9/2012 | Turner | G01B 9/02021 |
| | | | 348/135 |
| 2015/0043769 A1* | 2/2015 | Newman | G06K 9/00637 |
| | | | 382/100 |
| 2015/0082957 A1 | 3/2015 | Stein | |
| 2015/0194354 A1* | 7/2015 | Cheng | H01L 21/67092 |
| | | | 438/7 |
| 2018/0053317 A1* | 2/2018 | Inui | G06T 7/60 |

OTHER PUBLICATIONS

French Search Report from FR Application No. 1756126, dated Jan. 19, 2018.

* cited by examiner

METHOD FOR DETERMINING A DIMENSION BETWEEN THE BACK AND THE CUTTING EDGE OF A VIBRATING BLADE MOUNTED ON A CUTTING TOOL

BACKGROUND OF THE INVENTION

The present invention relates to the general field of automatic cutting by a vibrating blade of a flexible material placed on the cutting table in the form of a single ply or a stack of plies.

One field of application of the invention is that of the automatic cutting of parts in a flexible textile or non-textile (e.g. leather) material, in particular in the confection, furniture or automobile upholstery industry.

One known method for automatically cutting parts in a flexible material consists of feeding the material to a fixed or movable cutting support of the cutting table, in the form of a single ply or a stack of plies forming a mattress, and cutting the parts by means of a cutting tool moving above the cutting support of the table. The cutting head carries in particular a vibrating steel blade which is vibrated vertically in the direction of its cutting edge so as to cut the material.

The profile of the cutting blade, and particularly the position of its cutting edge, evolves regularly during its use and as a function of the successive sharpenings which are performed. Accurate knowledge of the profile of the cutting edge of the blade during its evolution is necessary information for allowing successive cuts of parts to be parametrized correctly so that they remain in conformity with expectations for the duration.

To this end, it is commonplace to use a wear plan for the cutting edge of the blade and a wear compensation plan for the abrasive used for the sharpening of the blade (corresponding to the variation of pressure, during the life of the blade, of the abrasive strip or the sharpening wheel), the abrasive wear compensation plan being a function of the nature of the blade and the sharpening conditions and the nature of the abrasive. This information is taken into account for updating the parameters of the cutting head, particularly for modifying cutting trajectories.

This method of checking the dimension between the back and the cutting edge of the vibrating blade does, however, have a certain number of disadvantages. An initial dimensional gap between the theoretical dimension of the back and the cutting edge of the blade and the real dimension thereof is generally observed. Yet this gap is continually used, which falsifies the information obtained. Moreover, the variability of the sharpening parameters can cause drifting between the planned wear of the cutting edge and the reality of this wear, which necessitates regularly measuring manually the dimensions of the blade and reintegrating them into the processing data of the cutting trajectories. In addition, taking into account manufacturing tolerances (dimensional, geometric and metallurgical) generates gaps.

Known from document US 2015/0082957 is a measuring device comprising a sensor mounted on the presser foot of the cutting head and which allows measuring, by means of a proximity sensor, the displacement of the end of the cutting edge of the blade due to repeated sharpening. This measuring method, however, has disadvantages, particularly due to the fact of its lack of accuracy, the measurement of the wear of the cutting edge of the blade being merely intermittent.

Also known from document FR 2,709,177 is a device for measuring the blade by contact, this device being mounted on the cutting head. Here the measurement is carried out by probing and by mechanical contact with the end of the cutting edge of the blade. Besides the disadvantages linked to the lack of accuracy of an intermittent measurement, this measuring method necessitates the implementation of mechanical means which can deteriorate the cutting edge of the blade due to contact.

OBJECT AND SUMMARY OF THE INVENTION

The present invention therefore has as its principal goal to propose a method for determining a dimension between the back and the cutting edge of a vibrating blade that does not have the aforementioned disadvantages.

In conformity with the invention, this goal is achieved due to a method for determining a dimension between the back and the cutting edge of a vibrating blade mounted on a cutting head and capable of being vibrated in a vertical direction for cutting a flexible material, comprising in succession:

acquiring a digital image of the blade mounted on the cutting tool so that a line corresponding to a cutting edge of the blade and a line corresponding to a back of the blade are visible in the image;

determining on the digital image along a straight line perpendicular to the line corresponding to the cutting edge of the blade the number of pixels comprised between the line corresponding to the cutting edge of the blade and the line corresponding to the back of the blade; and calculating a filtered dimension between the back and the cutting edge of the blade based on the number of pixels comprised between the line corresponding to the cutting edge of the blade and the line corresponding to the back of the blade.

The method according to the invention has numerous advantages. In particular, due to the image processing applied to the acquired image of a span of the cutting edge of the blade, the method according to the invention allows determining, not a single dimension between the back and the cutting edge, but a filtered dimension between the back and the cutting edge. As the wear of the cutting edge is not homogeneous over the entire height of the blade, the determination of a filtered dimension of the cutting edge allows obtaining a result that is more accurate and closer to reality. Moreover, the method according to the invention is without mechanical contact with the blade, which avoids any risk of deterioration of the cutting edge during measurement. Moreover, knowledge of the profile of the cutting edge of the vibrating blade allows verifying if it remains in a range compatible with the cutting quality to be attained. Finally, the creation of a digital image of the profile of the cutting edge allows detecting a possible adjustment fault or wear of the sharpening tool.

Preferably, the step consisting of taking a digitized image of the blade is accomplished by vibrating the blade at a vibration frequency which can reach the maximum vibration frequency allowed on the cutting machine. The vibration of the blade allows smoothing of the acquired image and allows taking into account a greater span of the cutting edge of the blade along its axis of vibration.

Preferably as well, the vibration of the blade is accomplished at a vibration amplitude comprised between 0.5 mm and 30 mm. This vibration amplitude is to be compared to the total height of the cutting edge, comprised within a range of 1 to 150 mm, for example on the order of 130 mm, and allows obtaining a significant average dimension of the cutting edge.

Alternatively, the step consisting of taking a digitized image of the blade can be accomplished with the blade in a static position. In this embodiment, the filtering of the acquired image can be applied to the image by appropriate digital processing.

Also preferably, the method also comprises, prior to the step consisting of taking a digitized image of the blade, a calibration step consisting of taking a digitized image of a standard blade mounted on the cutting head, said standard blade having a known dimension between the back and the cutting edge.

The method can also comprise the use of the dimension between the back and the cutting edge of the blade to update the cutting head data. The cutting head data comprise in particular the cutting trajectories which are corrected depending on the dimension obtained for the cutting edge.

The step consisting of taking a digitized image of the blade can be accomplished by means of a digital camera mounted on the cutting head facing the blade. Thus, the filtered determination of the dimension between the back and the cutting edge does not require any particular manipulation of the blade mounted on the cutting head.

The camera can comprise a digital sensor having a resolution of 2592 by 1944 pixels and an acquisition speed of 15 images per second.

The invention also has as its object a device for determining a dimension between the back and the cutting edge of a vibrating blade mounted on a cutting head and capable of being vibrated in a vertical direction for cutting a flexible material, the device comprising means for vibrating the blade in a vertical direction, means for acquiring a digital image of the blade, and means for calculating a filtered dimension between the back and the cutting edge of the blade based on a number of pixels comprised between a line corresponding to the cutting edge of the blade and a line corresponding to the back of the blade.

Preferably, the device also comprises means for lighting the cutting edge of the blade.

BRIEF DESCRIPTION OF THE DRAWINGS

Other features and advantages of the present invention will be revealed by the description given hereafter, with reference to the appended drawings with illustrate one embodiment of it, free of any limiting character. In the figures.

DETAILED DESCRIPTION OF THE INVENTION

The invention applies to the automated cutting of parts in a flexible material appearing in the form of a single ply or a stack of plies.

Such a cutting operation is generally accomplished by means of a cutting machine equipped with a horizontal cutting support onto which is fed the flexible material to be cut.

Figure 1:
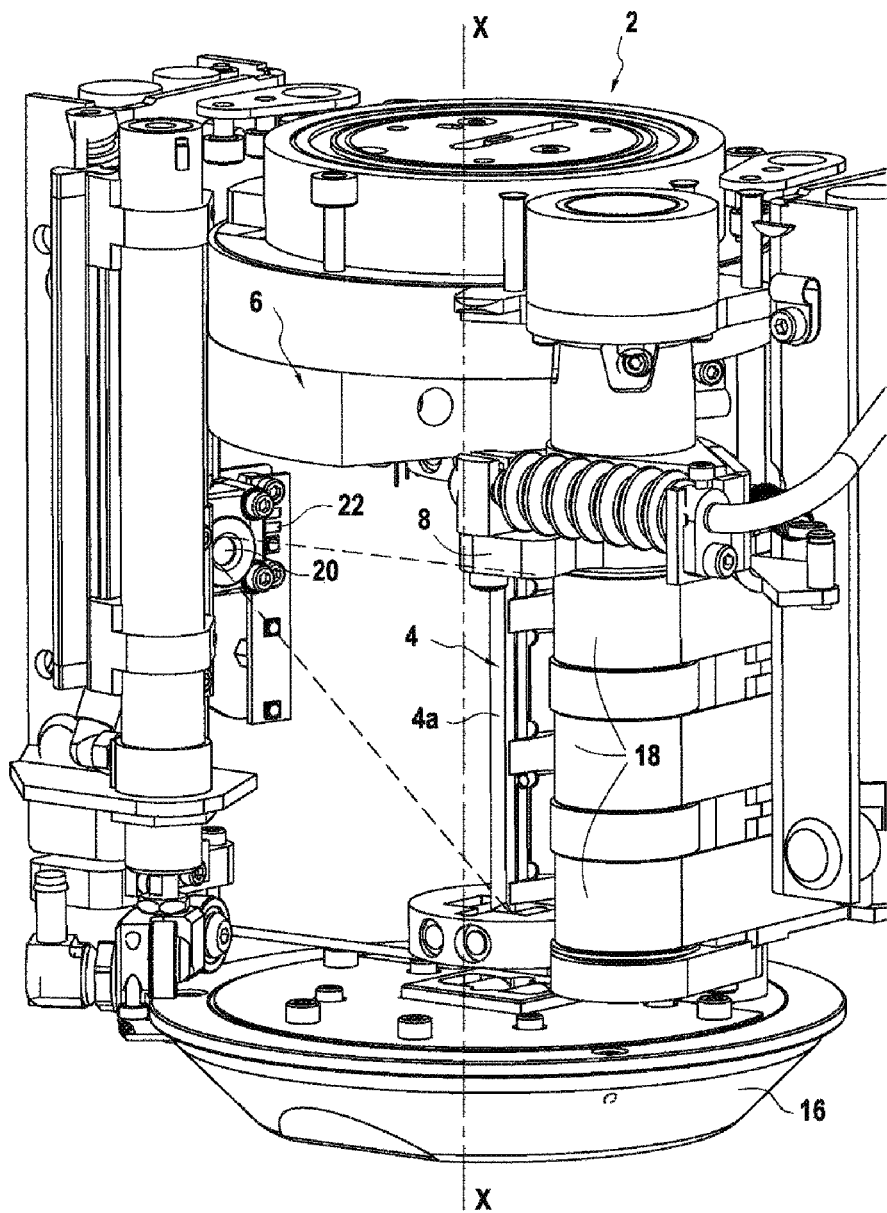
FIG. 1 is a schematic view showing a cutting head equipped with a device for determining a dimension between the back and the cutting edge of a vibrating blade according to the invention.

The cutting machine also comprises a gantry on which is mounted a cutting head, such as the cutting head 2 partially shown in FIG. 1. Typically, this cutting head comprises in particular a vibrating blade 4 and can comprise one or more secondary cutting tools (drills for example).

Cutting software determines the different cutting trajectories of the flexible material. Under the control of a workstation, the gantry of the cutting machine moves along the cutting support while the cutting head can move simultaneously along the gantry so as to be able to follow the different cutting trajectories calculated by the cutting software.

In known fashion, the cutting head 2 comprises a frame 6 which is mounted on the gantry of the cutting machine, this frame supporting the vibrating blade 4. More precisely, the cutting head comprises a tool holder 8 at the end of which is mounted the vibrating blade 4, the latter being mounted vertically.

In known fashion, the cutting head 2 also comprise a motor for pivoting the blade (not shown in the figures) allowing the vibrating blade 4 to be pivoted around its vertical axis X-X so as to follow the pre-established cutting trajectories, as well as a vibrating motor for the blade (not shown in the figures) allowing the blade to be vibrated (in a direction parallel to its vertical axis).

By way of indication, for a vibrating blade 4 of 300 mm in length, the vibration thereof is accomplished with a vertical amplitude of 25 mm and at a maximum vibration frequency of 100 Hz.

The cutting head 2 also comprises a mechanism with two rams (not shown in the figures) allowing vertical displacement of the vibrating blade 4 between a lowered working position and a raised position (the blade is in the raised position in FIG. 1).

A presser foot 16 is mounted on the lower part of the frame 6 of the cutting head so as to press the flexible material on its cutting support during cutting, the height of this presser foot being adjustable depending on the height of the flexible material place on the cutting support.

The tool carrier 8 is equipped with means for sharpening the vibrating blade 4, and more precisely its cutting edge 4a. In the exemplary embodiment of FIG. 1, these sharpening means comprise three abrasive strips 18 spaced vertically from one another and able to be rotated by means of a motor around a vertical axis parallel to the vertical axis X-X of the vibrating blade.

The sharpening of the cutting edge 4a of the vibrating blade 4 by means of abrasive strips, grinding wheels or any other device is accomplished after a given cutting perimeter is reached or when a corner on the contour to be cut is reached. To this end, the vibrating blade is move vertically to be brought into the raised position and it is pivoted around its vertical axis to position a first flank of its cutting edge facing the abrasive strips, the blade is vibrated and the rotating abrasive strips are brought into contact with the blade to sharpen the cutting edge over most of its height. The process is repeated for the second flank of the blade after having disengaged the abrasive strips in contact with the blade. The blade is pivoted 180° to present its second flank facing the abrasive strips.

According to the invention, a device allows determining automatically a filtered dimension between the back and the cutting edge 4a of the vibrating blade 4, particularly after each sharpening operation or after a predetermined number of sharpenings. This determination is accomplished with the vibrating blade mounted on the cutting head 2 without requiring its disassembly.

To this end, the device for determining a filtered dimension between the back and the cutting edge of the vibrating blade comprises in particular a camera for acquiring digital images 20 which is mounted on the frame 6 of the cutting head 2 facing the vibrating blade 4 when it is brought into the raised position (FIG. 1).

The camera for acquiring digital images 20 is for example a camera equipped with a digital sensor having a resolution of 2592 by 1944 pixels and an imaging speed of 15 images per second.

The camera for acquiring digital images 20 is connected to software image processing means (not shown in the figures) known to a person skilled in the art, for accomplishing a certain number of calculations on the digital images.

The device for determining a filtered dimension between the back and the cutting edge of the vibrating blade also comprises lighting means 22 mounted on the frame 6 of the cutting head for lighting the cutting edge of the vibration blade during imaging.

The determination of a filtered dimension between the back and the cutting edge of the vibrating blade is accomplished according to the invention in the following manner.

A first step consists of bringing the vibrating blade 4 into the raised position as is the case in FIG. 1. This step is implemented by activating the ram mechanism of the cutting head. In this raised position, the cutting edge 4a of the blade is positioned facing the camera 20.

The vibrating blade is then positioned around its vertical axis X-X so as to position its cutting edge in a direction perpendicular to the imaging axis of the camera 20. This step is implemented by activating the blade pivoting motor of the cutting head.

In order to perfectly align the vibrating blade with the imaging axis of the camera 20, it is advantageous to define a reference inclination of the blade so as to then apply it to all imaging.

In one embodiment, the vibrating blade is then vibrated slowly in a vertical direction at a vibration frequency preferably comprised between 1 and 20 Hz. This step is implemented by activating the blade vibrating motor of the cutting head.

The slow vibration of the vibrating blade later allows having the benefit of a digital image of the blade which is smoothed and allow taking into account a greater span of the cutting edge of the blade. In other words, the image of the cutting edge of the vibrating blade in slow vibration allows establishing an envelope of the profile of the maximums of the cutting edge and an envelope of the minimums of the cutting edge.

In another embodiment, the vibrating blade is not vibrated slowly and remains static during the acquisition of a digital image. To obtain a digital image thereof which is completely sharp, digital image processing is accomplished.

Figure 2:
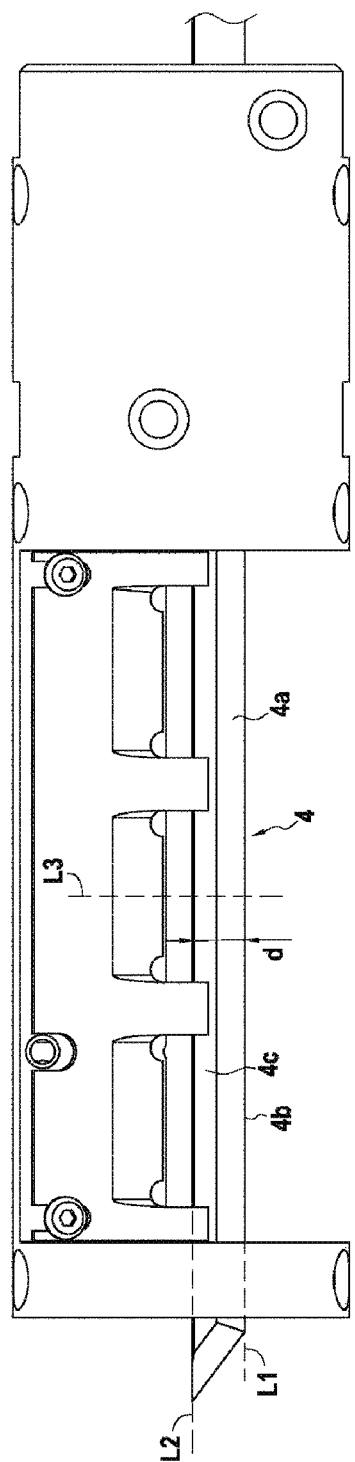
FIG. 2 is a schematic view showing an example of implementation of the method of determining a dimension between the back and the cutting edge of a vibrating blade according to the invention.

The camera 20 then allows acquiring digital images of the vibrating blade (in slow vibration or static). FIG. 2 shows the processing of one of these digital images 24 sent to the image processing software (for reasons of simplification, all elements have been withdrawn from the digital image 24 other than the vibrating blade).

It is provided, in conformity with the method according to the invention, to calculate on the digital image 24 the filtered dimension between the back and the cutting edge of the blade, i.e. the distance d between a first line L1 corresponding to a maximum of the envelope of the profile of the maximums of the cutting edge 4b of the vibrating blade 4 and a second line L2 corresponding to a back 4c of the vibrating blade. For determining the line L1, determination of the maximum value by applying a filter eliminating the specific points can be used.

Different methods in the field of image processing can be used to calculate this distance d based on the digital image 24.

According to one of the methods described here, it is provided to extract by thresholding the points determining the lines L1 and L2, then to determine the distance d between these lines L1 and L2. To this end, the image processing software determines on the digital image 24, along a straight line L3 perpendicular to the line L1 corresponding to the cutting edge of the blade, the number of pixels comprised between the lines L1 and L2.

Based on the known dimension of a pixel, the software then allow calculating the distance d separating the cutting edge 4b from the back 4c of the vibrating blade 4.

The determination of the filtered dimension between the back and the cutting edge of the blade is normally accomplished during the operating period of the blade (for example every 100 sharpenings). These data are then transferred to the control software of the cutting machine to modify the parameters of the cutting tool, and particularly the cutting trajectories, depending on the evolution of the profile of the cutting edge of the vibrating blade.

It will be noted that a calibration step is necessary prior to the implementation of the calculation of the filtered dimension between the back and the cutting edge of the blade.

This calibration step consists essentially of taking a digitized image of a standard blade mounted on the cutting head, this standard blade having a known dimension between the back and the cutting edge which can then be compared to the filtered dimension calculated at each measurement.

It will also be noted that additional processing can be applied to the digital images acquired by the camera, particularly as a function of the imaging conditions which are adopted (luminosity, lighting, contrast, imaging angles, etc.).

It will also be noted that based on the image of the cutting edge of the vibrating blade in slow vibration, it is also possible to determine the distance between a line corresponding to a minimum of the envelope of the profile of the minimums of the cutting edge of the vibrating blade and the line corresponding to the back of the vibrating blade. The determination of this distance allows ensuring that the wear profile of the blade remains comprised within a predetermined range. This feature thus allows:

confirming the correct adjustment and the good operating condition of the sharpening system;

alerting the user as well as the maintenance operator of the necessity of proceeding with an adjustment of the sharpening system or with a total or partial replacement of the elements of the sharpening system if this range is exceeded; and anticipating problems and thus guaranteeing optimal operation of the machine in terms of cutting.

The invention claimed is:

1. A method for determining a dimension between the back and the cutting edge of a vibrating blade mounted on a cutting head and capable of being vibrated in a vertical direction for cutting a flexible material, comprising in succession:

acquiring a digital image of the blade mounted on the cutting tool so that a line corresponding to a cutting edge of the blade and a line corresponding to a back of the blade are visible in the image;

determining on the digital image along a straight line perpendicular to the line corresponding to the cutting edge of the blade the number of pixels comprised between the line corresponding to the cutting edge of the blade and the line corresponding to the back of the blade; and calculating a filtered dimension between the back and the cutting edge of the blade based on the number of pixels comprised between the line corresponding to the cutting edge of the blade and the line corresponding to the back of the blade, wherein the step of acquiring the digitized image of the blade is accomplished by a visible-light, digital camera mounted on the cutting head facing the blade.

2. The method according to claim 1, wherein the step of acquiring the digitized image of the blade is accomplished by vibrating the blade at a vibration frequency within a frequency range that extends to a maximum vibration frequency allowed on the cutting machine.

3. The according to claim 2, wherein the vibration of the blade is accomplished at a vibration amplitude comprised between 0.5 mm and 30 mm.

4. The method according to claim 1, wherein the step of acquiring the digitized image of the blade is accomplished with the blade in a static position.

5. The method according to claim 1, also comprising, prior to the step of acquiring the digitized image of the blade, a calibration step that includes taking a digitized image of a standard blade mounted on the cutting head, said standard blade having a known dimension between the back and the cutting edge.

6. The method according to claim 1, also comprising using the dimension between the back and the cutting edge of the blade to update the cutting head data.

7. The method according to claim 1, wherein the camera comprises a digital sensor having a resolution of 2592 by 1944 pixels and an acquisition speed of 15 images per second.

8. A device for determining a dimension of the cutting edge of a vibrating blade mounted on a cutting head and capable of being vibrated in a vertical direction for cutting a flexible material, the device comprising:

means for vibrating the blade in a vertical direction;

means for acquiring a digital image of the blade, the means for acquiring the digital image of the blade including a visible-light, digital camera mounted on the cutting head facing the blade; and means for calculating a filtered dimension between the back and the cutting edge of the blade based on a number of pixels comprised between a line corresponding to the cutting edge of the blade and a line corresponding to the back of the blade.

9. The device according to claim 8, also comprising means for lighting the cutting edge of the blade.

* * * * *